Jan. 17, 1956 W. G. SECK 2,731,106
SUCTION CLEANER WITH PLEATED FILTER
Filed March 16, 1953 2 Sheets-Sheet 1

INVENTOR.
Werner G. Seck
BY *Alfred G. Gross*
ATTORNEY.

Jan. 17, 1956  W. G. SECK  2,731,106
SUCTION CLEANER WITH PLEATED FILTER
Filed March 16, 1953  2 Sheets-Sheet 2

INVENTOR.
Werner G. Seck
BY Alfred G. Gross
ATTORNEY.

United States Patent Office 2,731,106
Patented Jan. 17, 1956

2,731,106

SUCTION CLEANER WITH PLEATED FILTER

Werner G. Seck, Canton, Ohio, assignor to The Hoover Company, North Canton, Ohio, a corporation of Ohio Application March 16, 1953, Serial No. 342,400

5 Claims. (Cl. 183—51)

In the so-called cylinder or tank type vacuum cleaner, it is highly desirable to provide large filtering areas in a small casing having a very low center of gravity and a firm seat upon the floor to prevent the same from being readily tipped by a longitudinal pull on the dusting tool hose. Accordingly, it is an object of my invention to provide a suction cleaner encased in a low height housing having a substantial diameter to provide a large floor supporting area and having a heavy motor fan unit in the bottom of the casing and a light weight, large capacity air filter in the casing above the motor fan unit.

It is a particular object of my invention to provide a filter for suction cleaners of the foregoing type particularly characterized in that the filter is tailored to fit in the filter space and provides maximum dirt capacity and filtering area.

It is a further object of my invention to provide suction cleaner filters shaped in the form of a cylinder having imperforate end portions and a generally cylindrical wall joining the end portions thereof with an inlet substantially along the center line of the cylindrical wall.

It is a further object of my invention to provide a filter of the above described type which is constructed of two identical pieces of material, preferably filter paper, blanked, pleated and joined to form a cylindrical filter having substantially plane filtering end walls.

It is a further object of my invention to provide a suction cleaner filter constructed from two identical sheets of material, such as filter paper, which are blanked to substantially circular outline having radially projecting tabs adapted to form a filter inlet neck in which each filter sheet is provided with a plurality of spaced pairs of adjacent score lines so arranged that they meet along the arc of a circle having a diameter equal to the desired diameter of the end wall and are folded over to form the side walls or skirt portion of the paper into substantial parallelism to the axis of the filter.

Other objects and advantages of the invention will become apparent as the description proceeds when taken in connection with the accompanying drawing, wherein.

Figure 1:
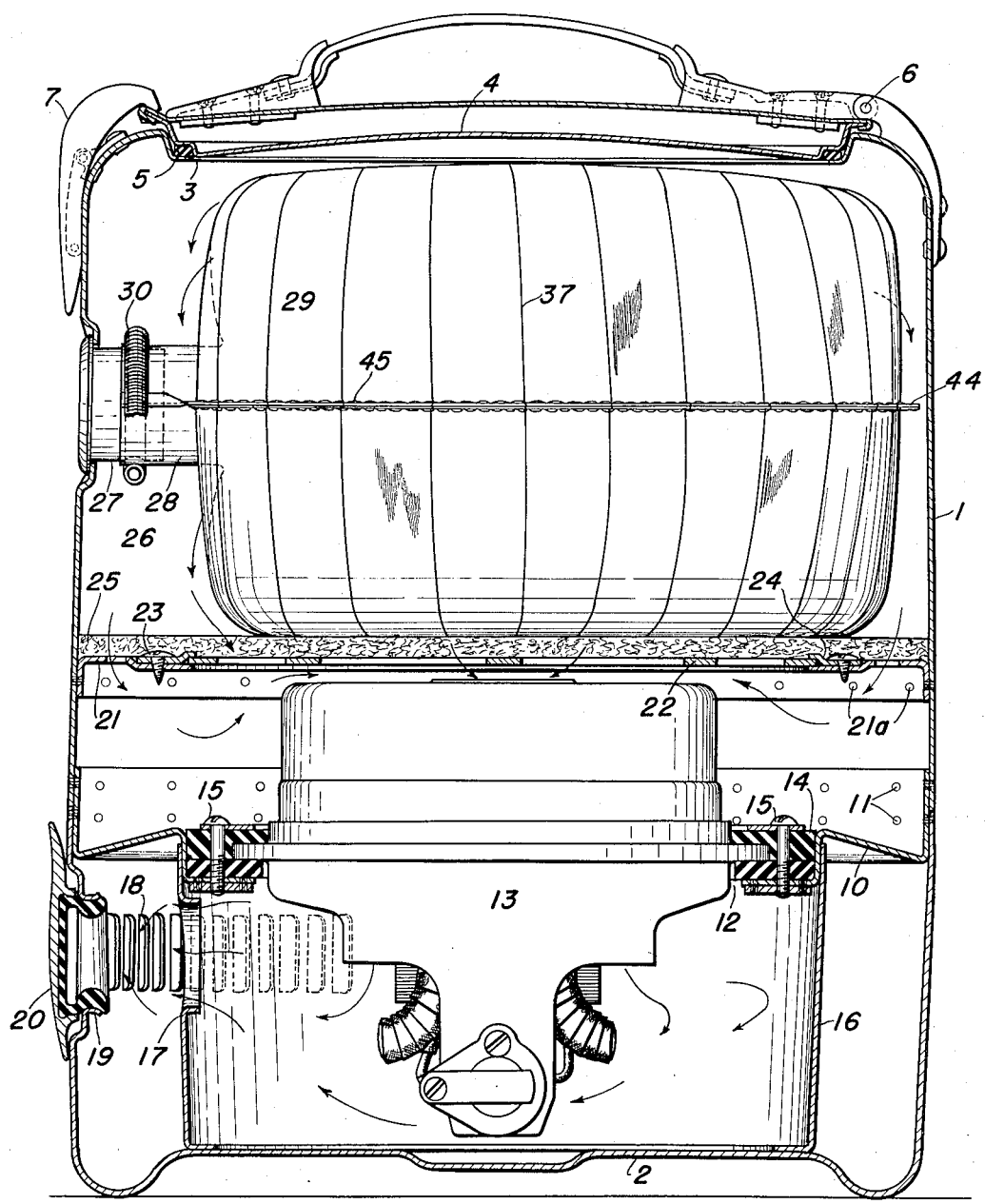
Figure 1 is a cross sectional view of a suction cleaner embodying my invention.

Referring now to the drawing and first to Figure 1 thereof, my apparatus comprises a generally cylindrical suction cleaner 1 having an imperforate bottom wall 2 and an opening 3 in the top wall. A top wall closure 4 is shaped to fit over the opening 3 and to seal around the same by resting upon a gasket 5 defining the perimeter of the opening 3. The closure 4 is mounted upon a pivot 6 secured to the casing 1 and adapted to be secured in closed position by having the top of the closure engaged by a toggle clamp 7 which is mounted on the casing 1. The lower portion of the casing 1 has a bulkhead 10 mounted therein and secured to the wall of the casing 1 by means of spot welds 11. The bulkhead 10 is provided with a central opening 12 within which is mounted a motor fan unit 13. The motor fan unit is secured to a rubber mounting 14 which is anchored to the bulkhead 10 by means of studs 15. The motor fan unit is mounted with the motor below the fan which is arranged to discharge into the area beneath the bulkhead 10. An annular wall 16 extends between the bottom wall 2 and the bulkhead 10 around the motor mounting to form a discharge chamber for the motor fan unit. This wall is provided with a circular outlet 17 into the space between the wall 16 and casing 1. The casing 1 is provided with a plurality of openings 18 for discharging air to the atmosphere. The casing 1 is also provided with an opening 19 closed by a removable closure 20 aligned with the opening 17 so that a suitable tool may be placed through these openings to cut off the annular space around the wall 16 when the cleaner is to be used for blowing operation. An annular perforated flange 21 is mounted in the casing 1 above the motor fan unit 13 and is secured thereto by spot welds 21a. A perforated plate 22 is supported on the flange 21 and is secured thereto by means of studs 23 and an annular clamping ring 24. The plate 22 is removable to provide access to the motor chamber and for removing the motor fan unit from the casing for replacement, repair and the like.

A felted-type filter 25 rests upon the upper surface of the flange 21 and plate 22 to form a secondary filter and to define the bottom of a filter chamber 26 within the casing 1 below the cover 4.

The casing 1 is provided with a tubular member 27 opening through the outer wall thereof and forming an inlet connection for a removable hose which is adapted to be connected to a dusting tool. The member 27 is also telescopically received within the inlet neck 28 of a filter 29 to be described more fully hereinafter. A garter spring 30 mounted on the member 27 seals the filter inlet neck 28 to the member 27, thus forcing all air flowing through the member 27 to pass through the filter before reaching the motor fan unit.

The filter 29 is best understood by first making reference to the method of constructing it.

Figure 3:
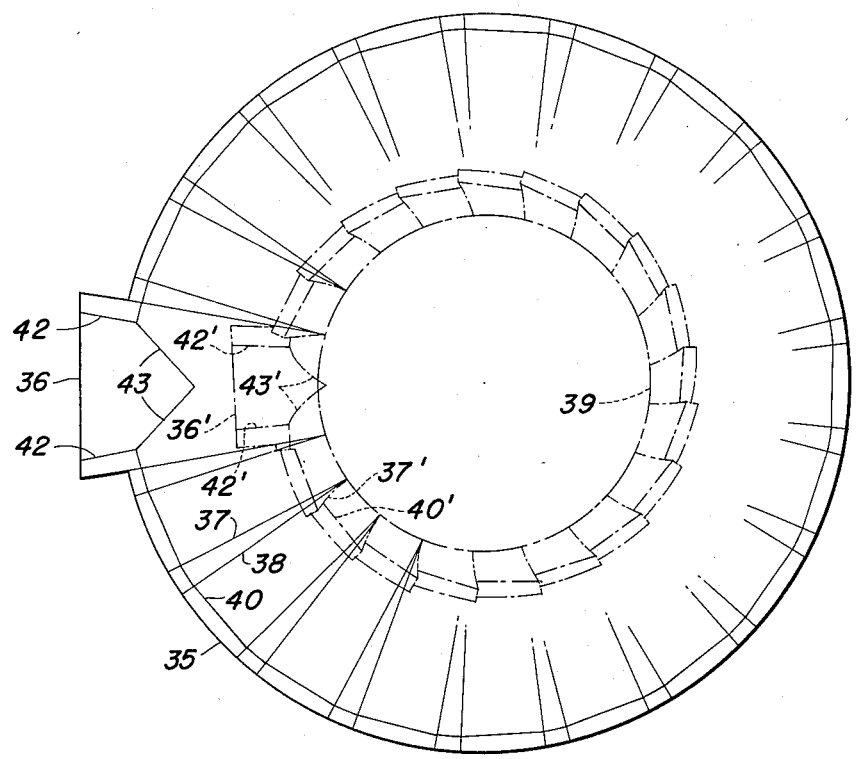
Figure 3 is a plan view of a blank used constructing the filter of Figure 2.

In Figure 3, a blank 35 is illustrated which will form one half of the filter, the filter being formed of two identical blanks shaped, scored and formed as described below. As is apparent from Figure 3, the blank 35 is circular in outline and is provided with a radially projecting tab section 36 at one side thereof. The blank 35 and certain scoring thereon to be described may be produced in a single operation from a combined punch and scoring die. The blank 35 is formed with a plurality of spaced pairs of score marks 37 and 38 which join each other along the line of an imaginery circle 39 which indicates the extent of the plane top or bottom portion of the completed filter. The lines 37 and 38 meet at an apex on the line 39 and diverge from each other to the outer edge of the blank 35. The score lines 37 are scored upwardly from the plane of the drawing and the score lines 38 downwardly from the plane of the drawing for a purpose to be described hereinafter. A score line 40 downwardly of the plane of the paper is made around the periphery of the blank 35 spaced a short distance from the edge thereof and is continuous except for an interruption in the region of the tab 36 which will be described. The tab 36 is formed with score lines 42 downwardly from the plane of the paper extending from the edge thereof inwardly to a junction with the score line 40. Additional score lines 43 extend from the junction of the score lines 42 inwardly of the tab to a junction between the lines 43.

Figure 2:
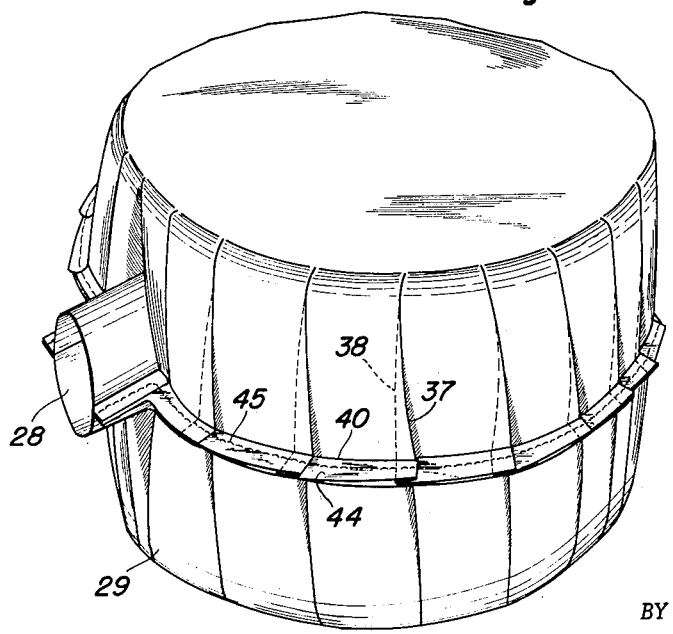
Figure 2 is a perspective view of a filter used in the suction cleaner illustrated in Figure 1.

After the blanking and scoring operation is completed, the blank is folded on the scores 37 and 38 folding the scores 38 back under the score 37 to form pleats as indicated in Figure 2. In Figure 2, the exposed edges formed by the scores 37 are given that reference character and the hidden edges of the pleat indicated by the dotted lines are given the reference character 38 as these edges are formed by the scores 38. As this operation continues, the blank assumes a cup shape having a flat top and a cylindrical side wall. As the foregoing pleating and folding operation is completed, the tab 36 is drawn in toward the cylindrical body with the portions thereof between the scores 42 and 43 curved upwardly to form one half of the tubular inlet mouth 28. The portion of the blank 35 outwardly of the scores 40 and 42 are then bent at right angles to the cylindrical wall of the cup to form a bonding flange 44. Two identical folded and formed members 35 are next placed in opposed relation with the flanges 44 abutting after which the flanges are secured together by any suitable means, as by a line of stitching 45. The bonding of the two flanges 44 also bonds the overlapped portion of the pleats bent into the flange and anchors the pleats to the completed structure so that the same cannot come out. As a consequence of the foregoing construction, the filter body now formed consists of two identical cup shaped parts each having a flat bottom, a pleated side wall and a radially extended flange with a half-round opening projecting therefrom adapted to mate with an identical article to form a complete inlet opening.

Figure 3 shows in solid line the configuration of the flat blank of paper, for example, from which each half of the filter is formed. The dashed line showing illustrates a plan view of the parts of the blank 35 after the same are folded. Parts of the dashed line showing in Figure 3 are given the same reference characters, distinguished by a prime, as the corresponding full line portions to illustrate the movement or change in position of the various parts of the blank as the same is folded into the cup shape.

A filter constructed in the manner above described has a very large dirt holding capacity and a large air filtering capacity. The air filtering capacity of the filter is larger than the apparent surface of the filter would indicate because the pleated portions are largely active filtering areas and to that extent enhance the filtering capacity of the device. Additionally, the filter is formed to fit snugly within the filter chamber 36 allowing sufficient room around the filter to permit free airflow therefrom to the secondary filter 25 and thence to the motor fan unit. It is a particularly advantageous feature of this filter that it is shaped complementally to the filter space in the cleaner casing so as to occupy the same with maximum efficiency without crowding the filter and with substantially constant or uniform air clearance volume surrounding the same.

In the use of the device, the filter is readily inserted or removed by releasing the latch 7 and pivoting the closure 4 to the open position.

While the invention has been illustrated and described in detail herein, it is not to be limited thereto but various changes may be made in the construction, design and arrangement of parts without departing from the spirit of the invention or the scope of the claims.

I claim:

1. A filter for suction cleaners comprising a pair of identical cup-like parts each having a substantially plane circular section base portion joined to a substantially cylindrical wall portion having a plurality of spaced circumferential pleats therein of triangular shape having their apices merging into said base portions and their bases terminating in a radially outwardly directed flange forming the rim portion of said cylindrical wall, said cup-like parts being positioned in opposed relation with the flanges thereof in abutting relation, means securing said flanges together, and an inlet tube piercing the wall formed by said cylindrical wall portions.

2. A filter for suction cleaners comprising a hollow body formed of a pair of identical cup-shaped members each having a substantially plane bottom wall portion circular in plan joined to a substantially cylindrical wall section formed with a plurality of spaced circumferential pleats and terminating in a radially outwardly directed peripheral flange, said cup-shaped members being positioned in opposed relation with the peripheral flanges thereof in abutting relation, means bonding said flanges to each other, and an inlet tube piercing a wall of said filter for leading air to be filtered thereinto.

3. A filter for suction cleaners comprising a hollow body of a pair of identical cup-shaped members, each of said cup-shaped members being formed of a plane sheet of filter material circular in plan and folded at spaced points between the periphery thereof and an imaginary circle parallel to the periphery thereof to form a cylindrical wall portion projecting from one face of the portion of said sheet of filter material within said circle, said wall portion terminating in a peripheral flange formed by bending the edge portion of said cylindrical wall substantially at right angles to said cylindrical wall, said cup-shaped members being assembled in opposed relation with the flanges thereof in abutting relation, and means bonding said flanges to each other.

4. A filter for suction cleaning apparatus comprising a hollow body of filter material formed of a pair of identical members, each of said members being formed of a plane sheet of filter material folded at spaced points from the periphery thereof inwardly to points spaced from the center thereof to bend the folded portion substantially at right angles to the unfolded portion thereof, said folded portion having the end thereof remote from said unfolded portion angularly bent to form a peripheral flange, said members being assembled in opposed relation with said flanges abutting each other, and means bonding said flanges together.

5. A filter for suction cleaning apparatus comprising a hollow body of filter material formed by a pair of identical sheets of filter material, each of said sheets of filter material being circular in plan with a projecting tongue on one side thereof, a plurality of circumferentially spaced triangular pleats formed in said sheet having their base portions at the periphery of said sheet and their apices equidistant from the periphery of said sheet and spaced a substantial distance from the center thereof to pull the pleated portion of said sheet into a generally cylindrical wall projecting from one surface of the unpleated portion of said sheet, said tab lying between an adjacent pair of said pleats, the edge portion of said sheet and said tab being bent to form a flange substantially parallel to the unpleated portion of said sheet, said sheet having a pair of folds extending from the junction of the portions of said flange on said tab and on said cylindrical wall to an apex spaced from the unpleated portion of said sheet whereby said tab forms a half-round member projecting from said cylindrical wall portion, said pleated sheets being assembled in opposed relation with said half-round members registering with each other and said flanges in abutting relation, and means securing said flanges together.

References Cited in the file of this patent

UNITED STATES PATENTS

| 1,074,008 | Nagel | Sept. 23, 1913 |
| 1,601,045 | Serva | Sept. 28, 1926 |
| 2,539,195 | Lang | Jan. 23, 1951 |
| 2,577,863 | Sosnowich | Dec. 11, 1951 |
| 2,639,001 | Meyerhoefer | May 19, 1953 |

FOREIGN PATENTS

| 14,303 | Great Britain | June 13, 1910 |